Figure 1:
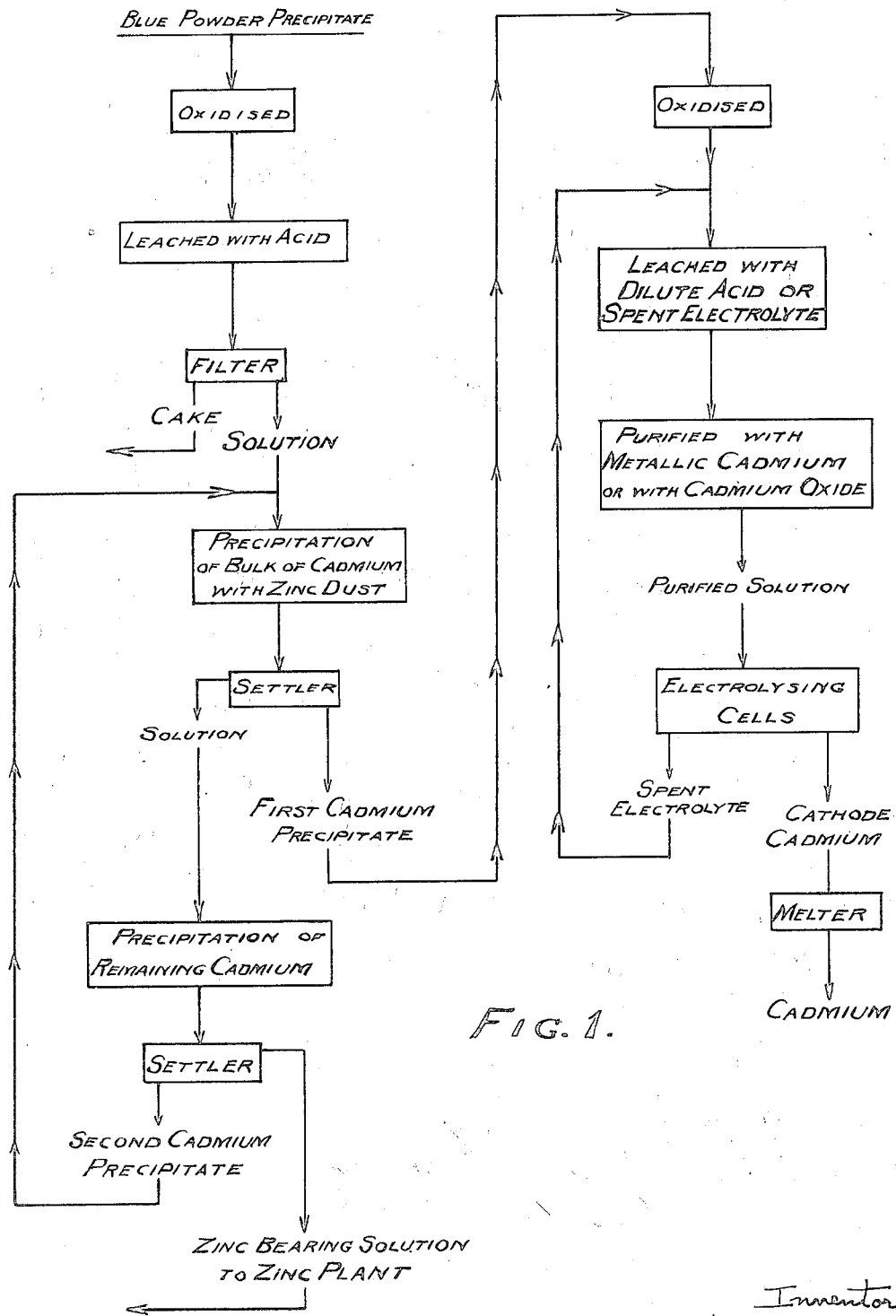

UNITED STATES PATENT OFFICE.

DAVID AVERY, OF MELBOURNE, VICTORIA, AND ROYALE H. STEVENS AND ROLAND T. D. WILLIAMS, OF RISDON, HOBART, TASMANIA, AUSTRALIA, ASSIGNORS TO ELECTROLYTIC ZINC COMPANY OF AUSTRALASIA PROPRIETARY LIMITED, OF MELBOURNE, VICTORIA, AUSTRALIA.

ELECTROLYTIC TREATMENT OF ORES CONTAINING ZINC, CADMIUM, AND COPPER.

1,426,703. Specification of Letters Patent. Patented Aug. 22, 1922.

Application filed March 16, 1920. Serial No. 366,362.

*To all whom it may concern:*

Be it known that we, DAVID AVERY, subject of the King of Great Britain, residing at Collins House, 360–366 Collins Street, Melbourne, in the State of Victoria, Commonwealth of Australia, by occupation chemical engineer, and ROYALE HILLMAN STEVENS, a citizen of the United States of America, and ROLAND THOMAS DRYLL WILLIAMS, a subject of the King of Great Britain, both metallurgists by occupation, of care of Electrolytic Zinc Company of Australasia Proprietary Limited, of Risdon, Hobart, in the State of Tasmania, Commonwealth of Australia, have invented new and useful Improvements in the Electrolytic Treatment of Ores Containing Zinc, Cadmium, and Copper, of which the following is a specification.

This invention relates to the electrolytic treatment of ores containing zinc and other metals and refers more especially to the treatment of precipitates and residues formed in the usual electrolytic zinc process, for the recovery from such residues and precipitates of the metals contained therein such as zinc copper and cadmium.

In the electrolytic recovery of zinc the ore is first roasted then leached with sulphuric acid (or spent electrolyte containing sulphuric acid) and the sulphate solution is separated from the insoluble residues. This sulphate solution is then purified with zinc dust or blue powder to precipitate certain metals that are usually associated with zinc in these ores—generally copper and cadmium. The precipitate may also contain cobalt, if present in the ore. The resultant precipitate is separated from the solution and contains considerable quantities of zinc, cadmium and copper. Copper, if not present in the ore, is usually added during the zinc dust purification to facilitate the precipitation of the cadmium and/or cobalt. It is well known that zinc dust can be employed in the same way as blue powder, and therefore in this specification wherever the term "blue powder precipitate" is used it is to be understood as including "zinc dust precipitate."

The object of this invention is to provide means for the treatment of this "blue powder precipitate" for the purpose of recovering the more important metals contained therein, viz., zinc, cadmium and copper.

We accomplish this object by providing a method of treatment of the aforesaid "blue powder precipitate" which comprises means whereby the zinc cadmium and copper are separated from each other and subsequently recovered, the cadmium being obtained in the form of a solution suitable for electrolysis and recovery as electrolytic metal.

For this purpose the precipitate either metallic or oxidized is submitted to treatment with sulphuric acid, in such a way as to take advantage of the difference in solubility of the aforesaid metals or of their oxides in the acid thus obtaining their partial separation from each other and subsequently obtaining a complete separation of cadmium and copper from the zinc by a method of incomplete precipitation as hereinafter described and then separating the cadmium from the copper.

When the "blue powder precipitate" contains little or no cobalt, the oxidized or roasted precipitate is treated with dilute sulphuric acid sufficient to dissolve a maximum of zinc and cadmium, and a minimum of copper. The clear solution is separated from the insoluble residue by filtration and this copper bearing residue is treated for the recovery of copper by known methods e. g. smelting.

The clear solution containing the zinc and cadmium and some copper is treated with blue powder or metallic zinc by a method of "incomplete" precipitation (as hereinafter described) to give a precipitate of cadmium free from zinc. This cadmium precipitate is roasted and treated with dilute sulphuric acid usually in the form of spent electrolyte from the cadmium electrolytic cells to form cadmium sulphate solution. This is purified by treatment with sufficient excess of cadmium precipitate or metallic cadmium or with cadmium oxide to precipitate the copper as metal or oxide and the separated solution is then treated in electrolytic cells for the recovery of cadmium, preferably as follows:—

The solution should contain about 100 grams of cadmium per litre and the effluent from the cells about 60 grams of acid per litre. Rotating aluminium cathodes are preferably adopted and a current density of about 20 amperes per square foot. If necessary glue is added to the electrolyte to the extent of about 2 lbs. of glue per ton of cadmium produced. The resultant cadmium is removed from the cathodes, melted under caustic soda and potassium cyanide and cast into slabs for the market in the usual way.

Figure 2:
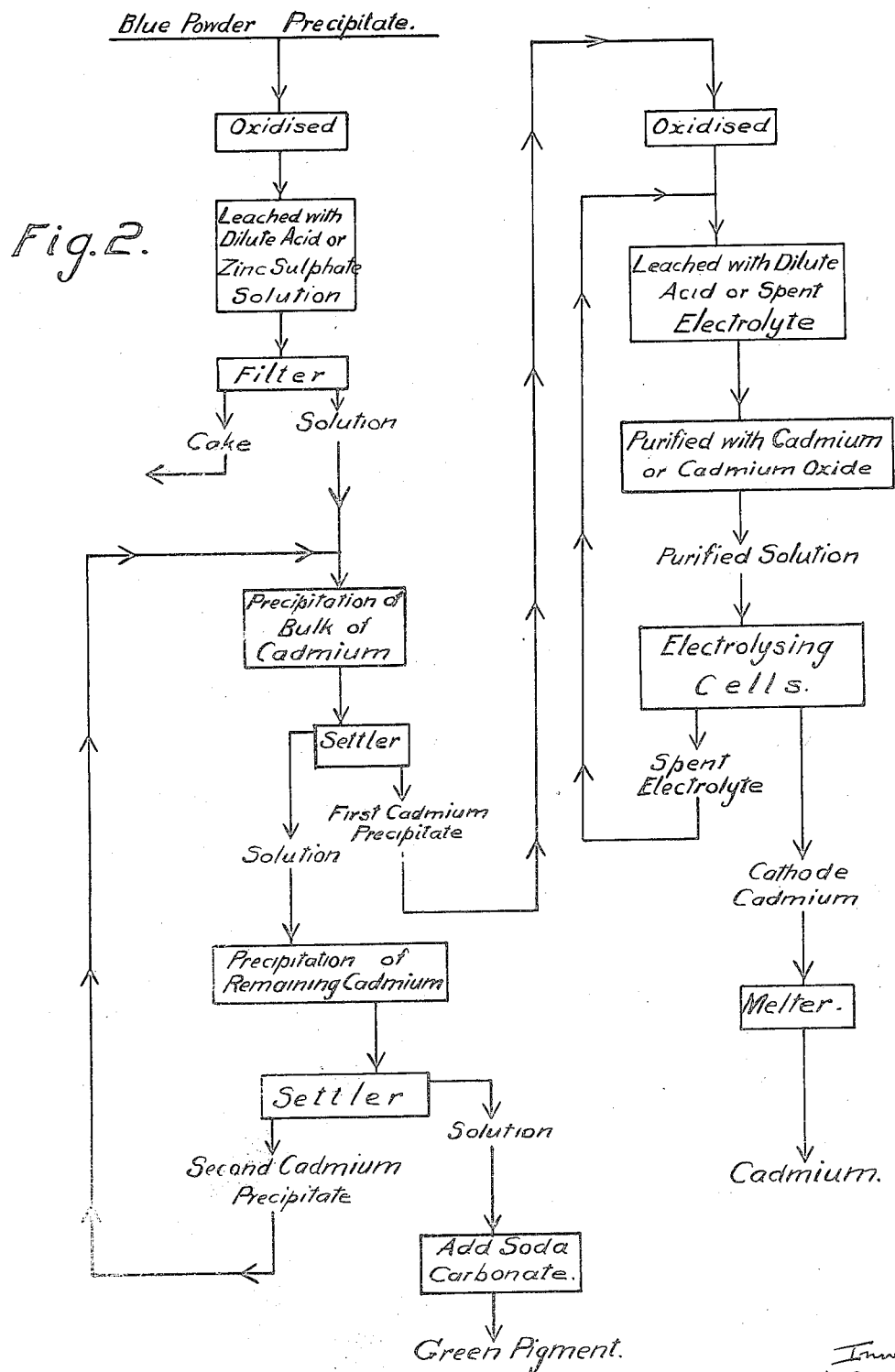
Figure 3:
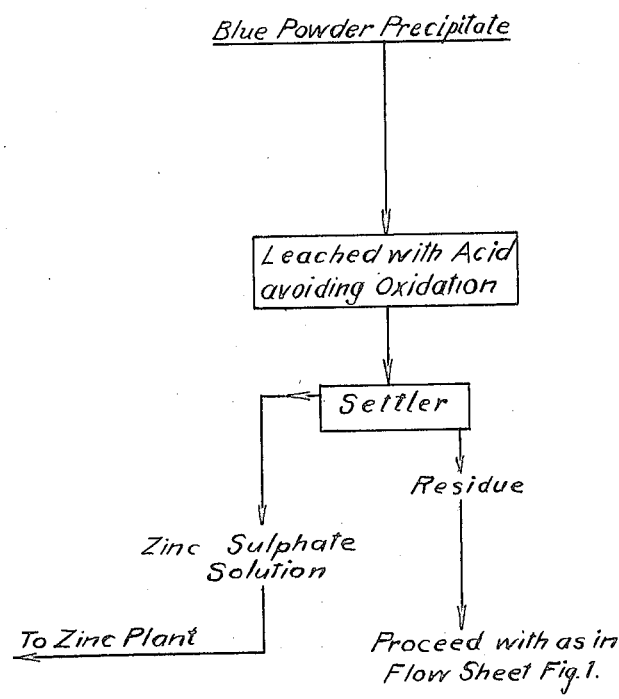

In the accompanying drawings the invention is illustrated by way of flow sheets. In these drawings, Fig. 1 is a flow sheet illustrating the treatment of cobalt-free precipitate; Fig. 2 is a flow sheet illustrating the treatment of cobalt-bearing precipitate, and Fig. 3 is a flow sheet illustrating the treatment of a non-oxidized precipitate. The flow sheets illustrated in the three figures of the drawings will be readily understood by those skilled in the art from the following description of the invention.

When the "blue powder precipitate" contains appreciable amounts of cobalt it is preferable to get rid of the bulk of this cobalt by a preliminary treatment as follows:—

The oxidized precipitate is treated with zinc sulphate solution or just sufficient dilute sulphuric acid to dissolve out most of the cadmium and the greater part of the cobalt, leaving the copper and the bulk of the zinc undissolved. The solution is separated from the insoluble residue, giving a cadmium bearing solution and a copper bearing residue.

The cadmium solution is treated with blue powder or metallic zinc by the method of "incomplete precipitation" (as hereinafter described) to obtain a cadmium precipitate free from zinc, which is separated from the solution and added to the cadmium precipitate subsequently obtained in the treatment of the copper bearing residue.

The solution remaining after the precipitation of the cadmium contains zinc and cobalt sulphates from which may be obtained the well known green pigment. A suitable method of preparing the pigment would be to add sodium carbonate to the solution and then to dry and heat the precipitate obtained.

The copper bearing residue which now contains zinc and but little cadmium or cobalt is treated as described above for "blue powder precipitate" when little or no cobalt is present.

An alternative method, based upon the different solubilities of the metals themselves may be adopted when cobalt is not present in appreciable amounts. The "blue powder precipitate" obtained from the zinc plant is treated with sufficient sulphuric acid to dissolve out the zinc leaving as far as possible the copper and cadmium undissolved, precautions being taken to prevent oxidation of the metals by exposure to the air or otherwise. The clear solution containing the zinc is separated from the residue containing copper and cadmium and is returned to the zinc plant. The residue containing cadmium and copper is roasted to form oxides, leached with dilute sulphuric acid sufficient to dissolve the cadmium leaving the copper in the residue. The filtered solution is then treated with blue powder or metallic zinc preferably by the method of "incomplete precipitation" to yield a purified cadmium precipitate which is oxidized, dissolved in spent electrolyte purified and electrolyzed for cadmium as described before.

The method of "incomplete precipitation" referred to above is as follows:—The solution containing sulphate of cadmium sulphate of zinc and small amounts of sulphate of copper is treated in an agitating vat with blue powder (or metallic zinc) in quantity insufficient to precipitate all the cadmium present preferably leaving about 0.5 grams of cadmium per litre in solution. During this precipitation air is excluded as far as possible and sulphuric acid is added until the solution is just acid. The clear solution is separated from the insoluble residue which consists now of cadmium practically free from zinc. The solution from this filtration contains mainly zinc sulphate with some remaining cadmium sulphate and is treated in a second agitation vat with an excess of blue powder to throw down all the cadmium present. To facilitate this precipitation, sufficient copper in solution is added so as to have preferably about half a gram of copper per litre present. This precipitate is separated by filtration and is returned for the treatment of the next batch of solution in the first vat thereby utilizing the excess of blue powder present. The quantities throughout are adjusted so as to give complete precipitation of cadmium in the second operation and incomplete precipitation of cadmium in the first operation, the object being to obtain from the first operation a cadmium precipitate as free as possible from zinc. The solution obtained after the complete precipitation of cadmium described above contains practically pure zinc sulphate and may be returned to the zinc plant for the recovery of its zinc by electrolysis.

An alternative method of removing zinc and obtaining an enriched cadmium product is as follows:—The solution of cadmium and zinc sulphates is heated to about 60° C. and agitated for some time with zinc oxide or preferably zinc hydroxide, and then cooled to about 35 degrees C. for the purpose of precipitating the zinc present as basic zinc sulphates. This precipitate is separated from the solution and may be returned to the zinc plant for treatment, the separated solution containing cadmium sulphate being treated for the recovery of cadmium.

We claim:—

1. A process for the treatment of blue powder precipitate obtained in the purifying of zinc bearing solutions for electrolysis, comprising oxidizing the precipitate, dissolving the metal oxides in dilute sulphuric acid sufficient to dissolve a maximum amount of zinc and cadmium, separating the cadmium and zinc bearing solutions from the residue, and recovering the cadmium and zinc from the solution so obtained.

2. A process for the treatment of blue powder precipitate obtained in the purifying of zinc bearing solutions for electrolysis, comprising oxidizing the precipitate, dissolving the metal oxides in dilute sulphuric acid sufficient to dissolve a maximum amount of zinc and cadmium and a minimum amount of copper, separating the copper bearing residue, and recovering cadmium and zinc from the solution so obtained.

3. In a process for the treatment of blue powder precipitate in which the precipitate is oxidized and the metal oxides dissolved in dilute sulphuric acid, the recovery of cadmium from the solution obtained, comprising the addition of finely divided zinc to the solution in quantities insufficient to precipitate the whole of the cadmium, thereby obtaining a precipitate of cadmium substantially free from zinc.

4. A process for the recovery of cadmium from blue powder precipitate, comprising oxidizing the blue powder precipitate and dissolving the oxides in dilute sulphuric acid, treating the solution obtained with finely divided zinc in quantities insufficient to precipitate the whole of the cadmium, thereby obtaining a precipitate of cadmium substantially free from zinc, oxidizing the zinc-free cadmium precipitate, dissolving the oxidized precipitate in dilute sulphuric acid, purifying the resulting solution by adding finely divided cadmium or cadmium oxide, and electrolyzing the purified solution to obtain metallic cadmium.

5. In the treatment of blue powder precipitate contaminated with cobalt, a process of recovering cadmium and incidentally zinc and also copper when present, which comprises oxidizing the precipitate, leaching the oxidized product with just sufficient dilute sulphuric acid to dissolve the greater proportion of cadmium and the bulk of the cobalt, leaving two products, namely, a solution from which cadmium free from cobalt can be precipitated and a zinc residue containing some cadmium and any copper present originally but substantially free from cobalt.

6. A process for the treatment of blue powder precipitate containing zinc, copper, cobalt, and cadmium, which comprises oxidizing the precipitate, leaching the oxidized product with just sufficient dilute sulphuric acid to dissolve the greater proportion of cadmium and the bulk of the cobalt, thereby obtaining a solution containing cadmium and cobalt and a residue containing some cadmium and copper substantially free from cobalt, adding to the solution containing cadmium and cobalt a quantity of finely divided zinc insufficient to precipitate all the cadmium thereby obtaining a precipitate of cadmium substantially free from cobalt, oxidizing the cadmium precipitate, leaching the oxidized cadmium precipitate, purifying the solution, and electrolyzing the solution to obtain a metallic cadmium.

7. In a process for the treatment of blue powder precipitate as herein described wherein the solution containing zinc and cobalt sulphates remaining after the precipitation of the cadmium is utilized for the production of a green pigment.

8. A process for the treatment of blue powder precipitate containing cadmium, zinc and copper, which comprises leaching the precipitate with sufficient sulphuric acid to dissolve the zinc leaving a residue containing cadmium and copper, oxidizing the residue, leaching the oxidized product with sufficient dilute sulphuric acid to dissolve the cadmium leaving the copper in the residue.

9. A process for the treatment of blue powder precipitate containing cadmium, zinc, and copper, which comprises leaching the precipitate with sufficient sulphuric acid to dissolve the zinc leaving a residue containing cadmium and copper, oxidizing the residue, leaching the oxidized product with sufficient dilute sulphuric acid to dissolve the cadmium leaving the copper in the residue, separating the cadmium solution from the copper residue, and precipitating the cadmium by the addition of finely divided zinc insufficient in quantity to precipitate all the cadmium.

10. In the electrolytic treatment of ores containing zinc and cadmium with other metals wherein a precipitate containing cadmium, zinc, and other metals is obtained, the step which consists in precipitating cadmium free from zinc by adding to the solution finely divided zinc insufficient in quantity to precipitate the whole of the cadmium present.

11. In the electrolytic treatment of ores containing zinc and cadmium with other metals wherein zinc dust or "blue powder" is used for the purification of zinc bearing solutions thereby obtaining a precipitate of cadmium, zinc and other metals, the step in the process of recovering the cadmium which consists in precipitating cadmium free from zinc by adding to the solution finely divided zinc insufficient in quantity to precipitate the whole of the cadmium present.

12. In the electrolytic treatment of ores containing zinc and cadmium with other metals wherein a precipitate containing cadmium is obtained during the purification of zinc bearing solutions, the steps in the recovery of cadmium from this precipitate consisting of adding to the solution finely divided zinc insufficient in quantity to precipitate the whole of the cadmium present, and then adding excess of finely divided zinc to obtain a second precipitate containing the remainder of the cadmium.

13. In the electrolytic treatment of ores containing zinc and cadmium, wherein a precipitate containing cadmium and zinc is obtained, the step in the process of recovering cadmium consisting in obtaining a solution containing zinc and cadmium, heating the solution, adding zinc oxide or hydroxide and then cooling whereupon a basic zinc salt is precipitated, leaving the dissolved cadmium salt substantially free from zinc.

In testimony whereof we have signed our names to this specification in the presence of subscribing witnesses.

DAVID AVERY.
R. H. STEVENS.
R. T. D. WILLIAMS.

Witnesses for D. Avery:
T. G. ANDERSON,
G. R. CULLEN.

Witnesses for R. H. Stevens and R. T. D. Williams:
ALLAN MCINTYRE,
V. T. CHAMBERS.